(12) United States Patent
Cheng et al.

(10) Patent No.: US 8,890,416 B2
(45) Date of Patent: Nov. 18, 2014

(54) LED DRIVING DEVICE

(71) Applicant: Macroblock, Inc., Hsinchu (TW)

(72) Inventors: Chin-Chung Cheng, Hsinchu (TW); Yan-Cun Li, Hsinchu (TW); Ruei-Ming Gan, Hsinchu (TW)

(73) Assignee: Macroblock, Inc., Hsinchu (TW)

( * ) Notice: Subject to any disclaimer, the term of this patent is extended or adjusted under 35 U.S.C. 154(b) by 52 days.

(21) Appl. No.: 13/693,813

(22) Filed: Dec. 4, 2012

(65) Prior Publication Data
US 2014/0042907 A1 Feb. 13, 2014

(30) Foreign Application Priority Data

Aug. 10, 2012 (TW) .............................. 101129060 A (51) Int. Cl.
*H05B 37/00* (2006.01)
*H05B 37/02* (2006.01)
*H05B 33/08* (2006.01)

(52) U.S. Cl.
CPC ............ *H05B 37/02* (2013.01); *H05B 33/0845* (2013.01); *H05B 33/083* (2013.01)
USPC ............. 315/122; 315/77; 315/119; 315/224; 315/307

(58) Field of Classification Search
CPC ........... H05B 33/0815; H05B 33/0827; H05B 33/0818; H05B 33/083; H05B 33/0851; H05B 33/0824; H05B 33/089; H05B 33/0845; H05B 33/0848; H05B 33/0809; H05B 33/0821; H05B 33/0842; H05B 33/086

USPC ............. 315/307, 291, 186, 185 R, 193, 192, 315/294, 121, 297, 209 R, 224, 312, 308
See application file for complete search history.

(56) References Cited

U.S. PATENT DOCUMENTS

| | | | |
|---|---|---|---|
| 7,081,722 B1 | 7/2006 | Huynh et al. | |
| 7,521,879 B2 | 4/2009 | Hong et al. | |
| 7,888,888 B2 | 2/2011 | Huang et al. | |
| 2007/0145914 A1 | 6/2007 | Hong et al. | |
| 2007/0159750 A1* | 7/2007 | Peker et al. | 361/93.1 |
| 2008/0001547 A1* | 1/2008 | Negru | 315/189 |
| 2008/0094000 A1* | 4/2008 | Yamamoto et al. | 315/250 |
| 2011/0254467 A1 | 10/2011 | Chiang et al. | |
| 2011/0273102 A1* | 11/2011 | van de Ven et al. | 315/193 |

* cited by examiner

*Primary Examiner* — Thienvu Tran
*Assistant Examiner* — Christopher Lo
(74) *Attorney, Agent, or Firm* — Morris Manning & Martin LLP; Tim Tingkang Xia, Esq.

(57) ABSTRACT

A LED driving device adapted to driving N LED strings connected in series is provided. N is a positive integer greater than 1. The LED driving device includes (N−1) switch units, a current source, a detection unit and a control unit. The ith switch unit electrically connects to the (i+1) LED string in parallel or to the ith LED string in parallel, and 0<i≤(N−1). The current source supplies a driving current to drive the N LED strings. The detection unit outputs a detection signal according to a voltage of the current source, a first reference voltage and a second reference voltage. The control unit outputs a plurality of first control signals according to the detection signal to dynamically control an amount of the (N−1) switch units turned on.

6 Claims, 6 Drawing Sheets

LED DRIVING DEVICE

CROSS-REFERENCE TO RELATED APPLICATIONS

This non-provisional application claims priority under 35 U.S.C. §119(a) on Patent Application No(s). 101129060 filed in Taiwan, R.O.C. on Aug. 10, 2012, the entire contents of which are hereby incorporated by reference.

BACKGROUND

1. Technical Field

The disclosure relates to a driving device, and more particularly to a light emitting device (LED) driving device.

2. Related Art

Generally, LED driving device usually first coverts an AC voltage to a DC voltage, and then drives LEDs and controls the brightness of LEDs using a stable DC voltage or a stable DC current.

However, to turn on two or more than two LEDs connected in series, LED driving device must supply the voltage greater than the totality of the turned-on voltages of two or more than two LEDs. Thus, the power source with higher voltage value is required. This may cause higher power consumption. Moreover, if the current passing through LEDs is unstable, the brightness of LEDs may be affected. Thus, it is desirous to develop a new LED driving device, which may improve LED's illumination quality and have less power consumption.

SUMMARY

The disclosure provides a LED driving device adapted to driving N LED strings connected in series. N is a positive integer greater than 1. The LED driving device includes (N−1) switch units, a current source, a detection unit and a control unit. The ith switch unit electrically connects to the (i+1)th LED string in parallel or to the ith LED string in parallel, and 0<i≤(N−1). The current source electrically connects to the negative terminal of the first LED string and provides a driving current to drive the N LED strings. The detection unit electrically connects to the current source to receive a voltage of the current source, a first reference voltage and a second reference voltage to output a detection signal. The control unit electrically connects to the (N−1) switch units and the detection unit to receive the detection signal and output a plurality of first control signals according to the detection signal to dynamically control an amount of the (N−1) switch units turned on.

In one embodiment, when the voltage of the current source is greater than the first reference voltage, the control unit reduces the amount of the (N−1) switch units turned on.

In one embodiment, when the voltage of the current source is smaller than the second reference voltage, the control unit increases the amount of the (N−1) switch units turned on.

In one embodiment, when the voltage of the current source is greater than the second reference voltage and smaller than the first reference voltage, the control unit maintains the amount of the (N−1) switch units turned on.

In one embodiment, the detection unit includes a first comparator and a second comparator. The first input terminal of the first comparator receives the first reference voltage. The second input terminal of the first comparator receives the voltage of the current source. The output terminal of the first comparator outputs the detection signal. The first input terminal of the second comparator receives the second reference voltage. The second input terminal of the second comparator electrically connects to the second input terminal of the first comparator. The output terminal of the second comparator outputs the detection signal.

In one embodiment, the control unit includes a state signal generator and (N−1) switch units. The state signal generator electrically connects to the detection unit to receive the detection signal and according to the detection signal, outputs the first control signals. One of the first control signals corresponds to one of the (N−1) switch units.

In one embodiment, the current source includes an operation amplifier and a second transistor. The first input terminal of the operation amplifier receives a predetermined voltage. The second input terminal of the operation amplifier is grounded through a resistance. The gate terminal of the second transistor electrically connects to the output terminal of the operation amplifier. The drain terminal of the second transistor outputs the voltage of the current source. The source terminal of the second transistor electrically connects to the second input terminal of the operation amplifier.

In one embodiment, the state signal generator further outputs a second control signal according to the detection signal, and the control unit further includes a selection unit. The selection unit is configured between and electrically connects to the state signal generator and the first input terminal of the operation amplifier to receive the second control signal and a plurality of third reference voltages and select one of the third reference voltages as a predetermined voltage.

For purposes of summarizing, some aspects, advantages and features of some embodiments of the disclosure have been described in this summary. Not necessarily all of (or any of) these summarized aspects, advantages or features will be embodied in any particular embodiment of the disclosure. Some of these summarized aspects, advantages and features and other aspects, advantages and features may become more fully apparent from the following detailed description and the appended claims.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

The detailed features and advantages of the disclosure are described below in great detail through the following embodiments, the content of which is sufficient for those of ordinary skill in the art to understand the technical content of the disclosure and to implement the disclosure accordingly. Based upon the content of the specification, the claims, and the drawings, those of ordinary skill in the art can easily understand the relevant objectives and advantages of the disclosure.

In every embodiment of the disclosure, a uniform label indicates the same or similar elements.

Figure 1:
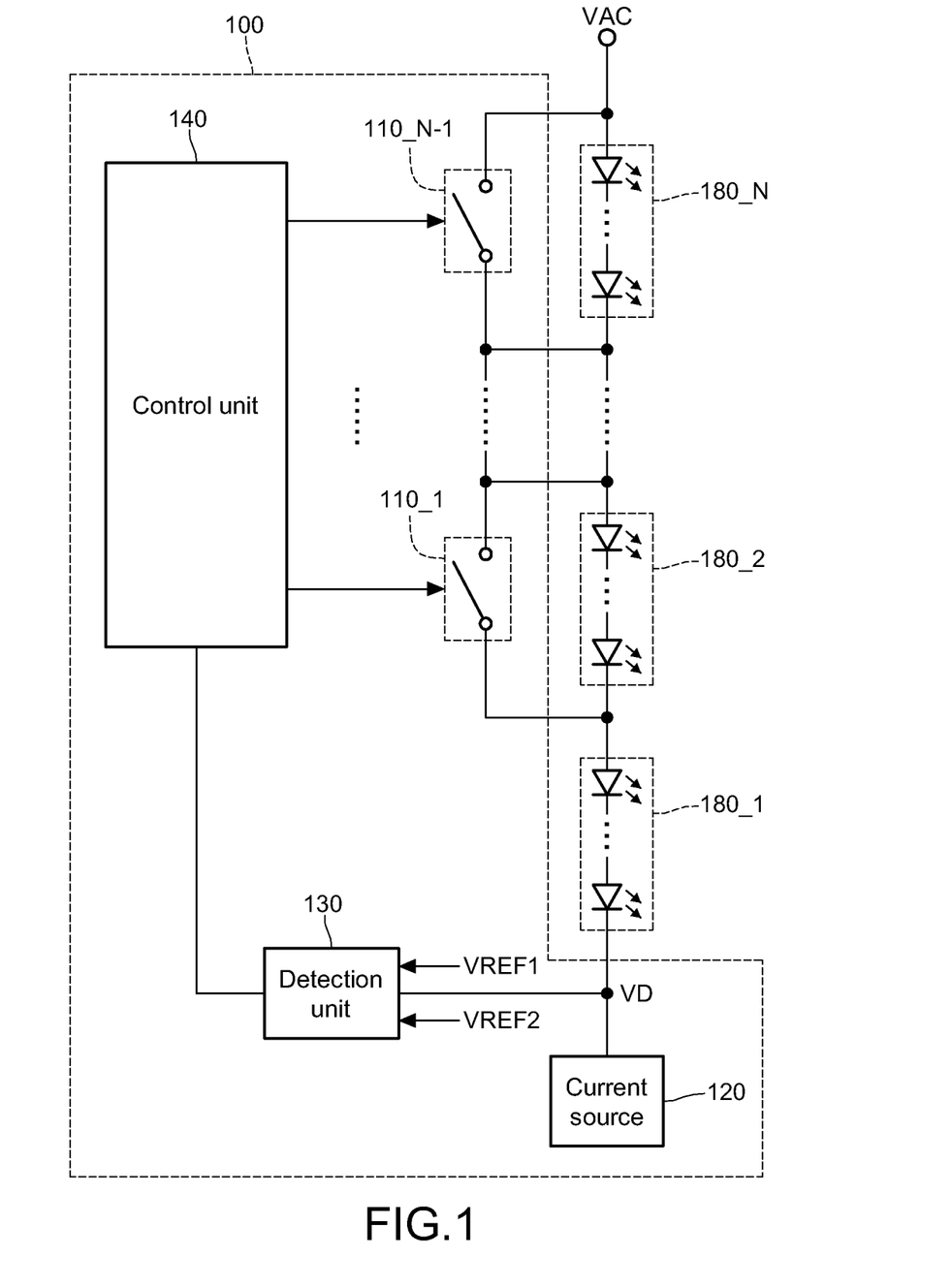
FIG. 1 is a block diagram of a LED driving device according to one embodiment of the disclosure.

FIG. 1 illustrates a block diagram of a LED driving device according to one embodiment of the disclosure. The LED driving device 100 is configured to drive N LED strings 180_1 to 180_N, and N is a positive integer greater than 1. The LED strings 180_1 to 180_N are connected in series. In one embodiment, the positive terminal of the first LED string 180_1 electrically connects to the negative terminal of the second LED string 180_2, the positive terminal of the second LED string 180_2 electrically connects to the negative terminal of the third LED string 180_3, and so forth. The positive terminal of the Nth LED string 180_N receives an operation voltage VAC such as the voltage generated by a bridge rectifier which rectifies an AC voltage.

Furthermore, each LED string includes a plurality of LEDs which are connected in series. In one LED string, the negative terminal of one LED electrically connects to the positive terminal of a next LED, the positive terminal of the first LED is set as the positive terminal of the LED string, and the negative terminal of the last one of the LEDs is set as the negative terminal of the LED string. The amount of the LEDs in each LED string is based on different application requests.

The LED driving device 100 includes (N−1) switch units 110_1 to 110_N−1, a current source 120, a detection unit 130 and a control unit 140. The ith switch unit electrically connects to the (i+1)th LED string in parallel, and i satisfies the equation: 0≤i≤(N−1). In one embodiment, the first switch unit 110_1 electrically connects to the second LED string 180_2 in parallel, the second switch unit 110_2 electrically connects to the third LED string 180_3 in parallel, and so forth.

The current source 120 electrically connects to the negative terminal of the first LED string 180_1 to provide a driving current to drive the LED strings 180_1 to 180_N. The detection unit 130 electrically connects to the current source 120 to receive a voltage VD of the current source 120, a first reference voltage VREF1 and a second reference voltage VREF2 and to outputs a detection signal according to the voltage VD, the first reference voltage VREF1 and the second reference voltage VREF2. The voltage VD is the node voltage at the node where the current source 120 electrically connects to the negative terminal of the first LED string, and is based on the current of the current source 120.

The control unit 140 electrically connects to (N−1) switch units 110_1 to 110_N−1 and the detection unit 130 to receive the detection signal and to output a plurality of first control signals according to the detection signal, and dynamically turns on or turns off the switch units 110_1 to 110_N−1 respectively. When the switch units 110_1 to 110_N are turned on, the LED strings 180_2 to 180_N are short-circuited and do not illuminate.

More practically, the LED string 180_2 is short-circuited and does not illuminate when the switch unit 110_1 is turned on. The LED string 180_2 which a current passes through may illuminate when the switch unit 110_1 is turned off. The LED string 180_3 is short-circuited and does not illuminate when the switch unit 110_2 is turned on, but illuminate when the unit 110_2 is turned off. As set forth above, other LED strings (the LED strings 180_4 to 180_N) may illuminate or not respectively according to the other switch units (the switch units 110_3 to 110_N−1) turned on or turned off. Thus, the control unit 140 may control the amount of the LED strings connected in series in the LED strings 180_1 to 180_N by respectively turning on or off the switch units 110_1 to 110_N−1.

Figure 2:
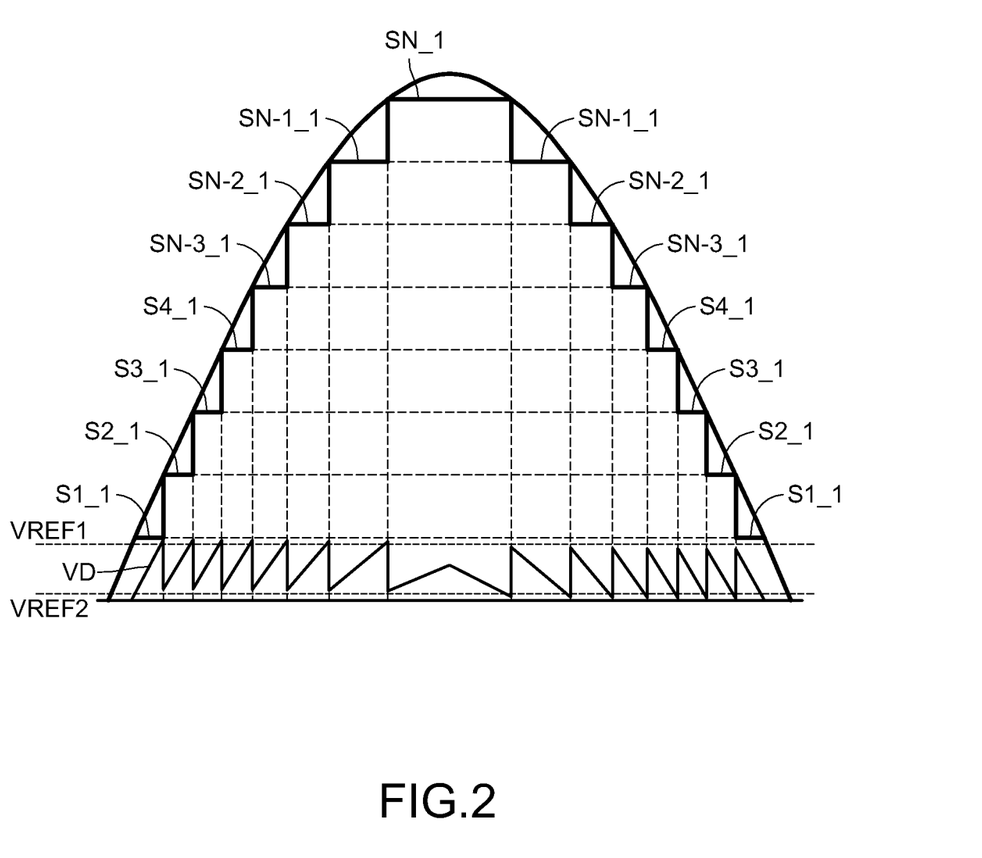
FIG. 2 is a schematic diagram of the waveforms illustrating the operation voltage, the first reference voltage, the second reference voltage, the voltage of the current source, and the current passing through the current source according to one embodiment of the disclosure.

FIG. 2 illustrates a schematic diagram of waveforms respectively based on an operation voltage, a first reference voltage, a second reference voltage, a voltage of the current source, and a current passing through the current source according to one embodiment of the disclosure.

When the switch units 110_1 to 110_N−1 are turned on, the first LED string 180_1 illuminates. The current passing through the current source 120 may be changed as the curve S1_1. When the switch unit 110_1 is turned off and the switch units 110_2 to 110_N−1 are turned on, the current passing through the current source 120 may be changed as the curve S2_1. When the switch units 110_1 and 110_2 are turned off and the switch units 110_3 to 110_N−1 are turned on, the LED strings 180_1 to 180_3 illuminate. The current passing through the current source 120 may be changed as the curve S3_1. When the switch units 110_1 to 110_3 are turned off and the switch units 110_4 to 110_N−1 are turned on, the LED strings 180_1 to 180_4 illuminate. The current passing through the current source 120 may be changed as the curve S4_1.

When the switch units 110_1 to 110_N−4 are turned off and the switch units 110_N−3 to 110_N−1 are turned on, the LED strings 180_1 to 180_N−3 illuminate. The current passing through the current source 120 may be changed as the curve SN-3_1. When the switch units 110_1 to 110_N−3 are turned off and the switch units 110_N−2 to 110_N−1 are turned on, the LED strings 180_1 to 180_N−2 illuminate. The current passing through the current source 120 may be changed as the curve SN-2_1. When the switch units 110_1 to 110_N−2 are turned off and the switch unit 110_N−1 is turned on, the LED strings 180_1 to 180_N−1 illuminate. The current passing through the current source 120 may be changed as the curve SN-1_1. When the switch units 110_1 to 110_N−1 are turned off, the LED strings 180_1 to 180_N illuminate. The current passing through the current source 120 may be changed as the curve SN_1. The detailed operation is described as below.

In one embodiment, when the voltage VD is greater than the first reference voltage VREF1, e.g. 18 volt, the current passing through the current source 120 increases. The control unit 140, according to the detection signal, reduces the amount of the switch units turned on, that is, increases the amount of the switch units turned off, to increase the amount of the LED strings connected in series and to increase the amount of the LED strings illuminating. The control unit 140 may, but not limit to, increase the amount of the turned-off switch units in order.

In one embodiment, when the voltage VD is smaller than the second reference voltage VREF2, e.g. 2 volt, the current passing through the current source 120 reduces. The control unit 140, according to the detection signal, increases the amount of the switch units turned on, that is, reduces the amount of the switch units turned off, to reduce the amount of the LED strings connected in series and to reduce the amount of the LED strings illuminating. The control unit 140 may, but not limit to, reduce the amount of the turned-off switch units in order.

In one embodiment, when the voltage VD is greater than the second reference voltage VREF2, e.g. 2 volt, and smaller than the first reference voltage VREF1, e.g. 18 volt, the current passing through the current source 120 is in a tolerant range. The control unit 140, according to the detection signal, maintains the amount of the switch units turned on to maintain the amount of the LED strings illuminating.

Figure 3:
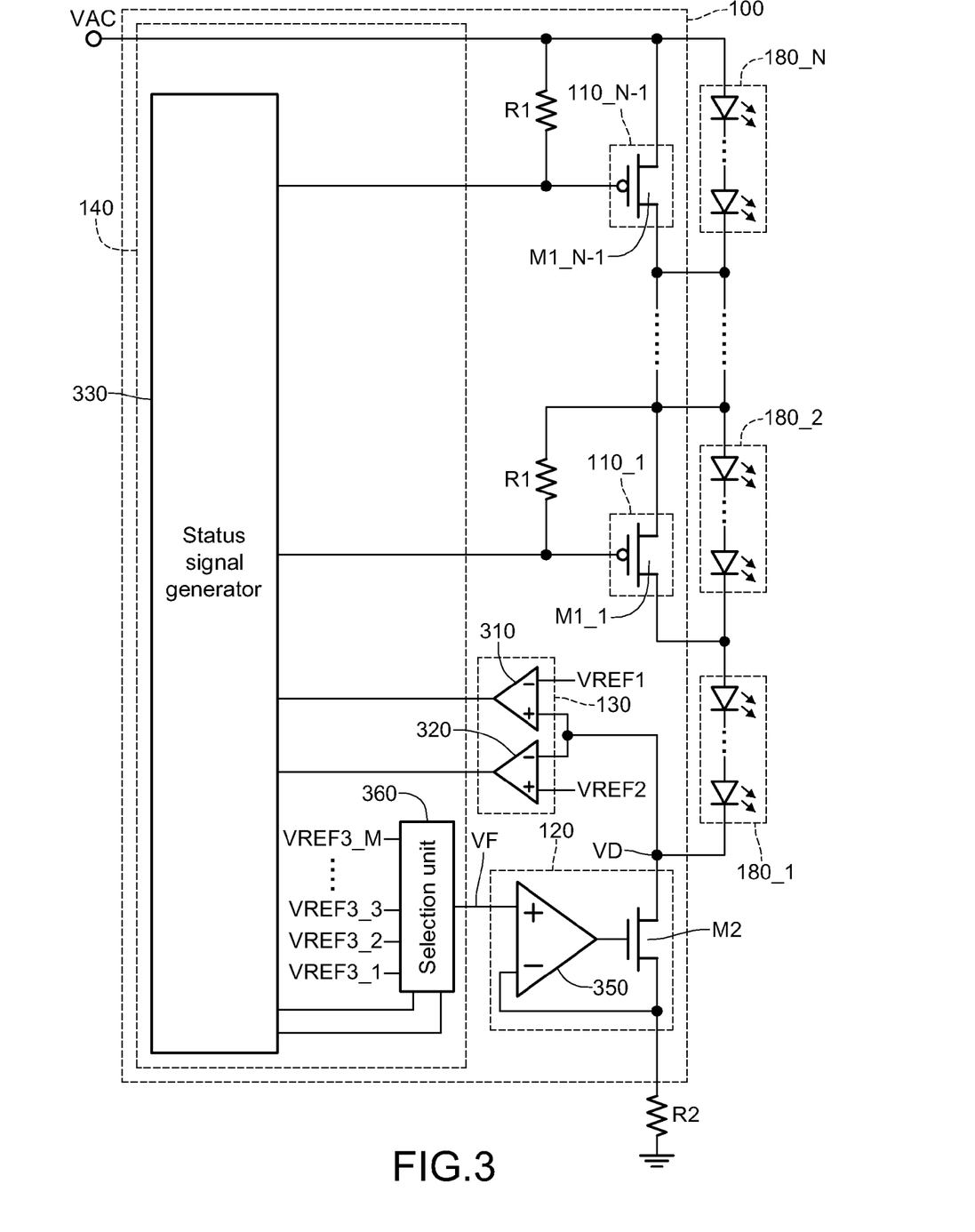
FIG. 3 is a circuit diagram of the LED driving device according to one embodiment of the disclosure.

FIG. 3 illustrates a circuit diagram of the LED driving device according to one embodiment of the disclosure. The switch units 110_1 to 110_N−1 may be the transistors M1_1 to M1_N−1 which may be p-type transistors. In other embodiment, the transistors M_1 to M1_N−1 may be n-type transistors.

The source terminal of the transistor M1_1 electrically connects to the positive terminal of the LED string 180_2. The drain terminal of the transistor M1_1 electrically connects to the negative terminal of the LED string 180_2. The gate terminal of the transistor M1_1 electrically connects to the control unit 140. The source terminal of the transistor M1_2 electrically connects to the positive terminal of the LED string 180_3. The drain terminal of the transistor M1_2 electrically connects to the negative terminal of the LED string 180_3. The gate terminal of the transistor M1_2 electrically connects to the control unit 140. As set forth above, the transistors M1_3 to M1_N−1 are arranged like above.

When the control unit 140 provides one first control signal of a high logic level to the gate terminal of one target transistor, the target transistor is turned off. Thus, the control unit 140 may turn on or off the transistors M1_1 to M1_N−1 respectively by controlling the voltages respectively provided to the gate terminals of the transistors M1_1 to M1_N−1. Moreover, a resistance R1 is configured between the gate terminal and the source terminal of each transistor to limit the current passing through the gate terminal and the source terminal.

The detection unit 130 includes a first comparator 310 and a second comparator 320. The first input terminal, e.g. the negative terminal, of the first comparator 310 receives the first reference voltage VREF1, e.g. 18 volt. The second input terminal, e.g. the positive terminal, of the first comparator 310 receives the voltage VD of the current source 120. The output terminal of the first comparator 310 outputs the detection signal. The first input terminal, e.g. the positive terminal, of the second comparator 320 receives the second reference voltage VREF2, e.g. 2 volt. The second input terminal, e.g. the negative terminal, of the second comparator 320 electrically connects to the second input terminal of the first comparator 310. The output terminal of the second comparator 320 outputs the detection signal.

When the voltage VD is greater than the first reference voltage VREF1, e.g. 18 volt, the first comparator 310 outputs the detection signal of a high logic level, the second comparator 320 outputs the detection signal of a low logic level, and the detection signal is marked as "10." When the voltage VD is smaller than the second reference voltage VREF2, e.g. 2 volt, the first comparator 310 outputs the detection signal of the low logic level, the second comparator 320 outputs the detection signal of the high logic level, and the detection signal is marked as "01." When the voltage VD is greater than the second reference voltage VREF2 and smaller than the first reference voltage VREF1, the first comparator 310 and the second comparator 320 output the detection signal of the low logic level, and the detection signal is marked as "00."

The control unit 140 includes a state signal generator 330. The state signal generator 330 electrically connects to the detection unit 130 to receive the detection signal and according to the detection signal, output the first control signals. The amount of the first control signals corresponds to that of the switch units 110_1 to 110_N−1. In one embodiment, the first control signals are generated by a thermometer code manner. Each first control signal is provided to corresponding one of the switch units 110_1 to 110_N−1.

For explanation of the connection and the operation among the components, the embodiment of four switch units 110_1 to 110_4 and four first control signals CS1 to CS4 is taken for illustration hereinafter. The first control signal CS1 is provided to the switch unit 110_1. The first control signal CS2 is provided to the switch unit 110_2. The first control signal CS3 is provided to the switch unit 110_3. The first control signal CS4 is provided to the switch unit 110_4.

When the state signal generator 330 receives the detection signal of "10" at first time, the state signal generator 330 in order outputs the logic levels of "0 0 0 1" of the first control signals CS4, CS3, CS2 and CS1 to turn off the switch unit 110_1. The LED string 180_2 operates for illustration. Moreover, whenever the state signal generator 330 receives the detection signal of "10" once, the state signal generator 330 may count once and accumulate the counting number. Thus, the accumulated counting number at first time is 1.

When the state signal generator 330 receives the detection signal of "10" at second time, the state signal generator 330 in order outputs the logic levels of "0 0 1 1" of the first control signals CS4, CS3, CS2 and CS1 to turn off the switch units 110_1 and 110_2 respectively. The LED strings 180_2 and 180_3 operate for illustration. The accumulated counting number at second time is 2.

When the state signal generator 330 receives the detection signal of "10" at third time, the state signal generator 330 in order outputs the logic levels of "0 1 1 1" of the first control signals CS4, CS3, CS2 and CS1 to turn off the switch units 110_1 to 110_3 respectively. The LED strings 180_2 to 180_4 operate for illustration. The accumulated counting number at third time is 3.

When the state signal generator 330 receives the detection signal of "10" at fourth time, the state signal generator 330 outputs the logic levels of "1 1 1 1" of the first control signals CS4, CS3, CS2 and CS1 to turn off the switch units 110_1 and 110_4 respectively. The LED strings 180_2 and 180_5 operate for illustration. The accumulated counting number at fourth time is 4.

Otherwise, when the state signal generator 330 receives the detection signal of "01" at first time and the accumulated counting number is 4, the state signal generator 330 outputs the logic levels of "0 1 1 1" of the first control signals CS4, CS3, CS2 and CS1 to turn on the switch unit 110_4. The LED string 180_5 is short-circuited and does not operate for illustration. The accumulated counting number becomes 3.

Subsequently, when the state signal generator 330 receives the detection signal of "01" at second time, the state signal generator 330 outputs the logic levels of "0 0 1 1" of the first control signals CS4, CS3, CS2 and CS1 to turn on the switch units 110_4 and 100_3. The LED strings 180_5 and 180_4 are short-circuited and do not operate for illustration. The accumulated counting number becomes 2.

When the state signal generator 330 receives the detection signal of "01" at third time, the state signal generator 330 outputs the logic levels of "0 0 0 1" of the first control signals CS4, CS3, CS2 and CS1 to turn on the switch units 110_4 to 100_2. The LED strings 180_5 to 180_3 are short-circuited and do not operate for illustration. The accumulated counting number becomes 1.

When the state signal generator 330 receives the detection signal of "01" at fourth time, the state signal generator 330 outputs the logic levels of "0 0 0 0" of the first control signals CS4, CS3, CS2 and CS1 to turn on the switch units 110_4 to 100_1. The LED strings 180_5 to 180_2 are short-circuited and do not operate for illustration. The accumulated counting number becomes 0.

Through the above process of various states of the detection signal, the LED driving device 100 may accurately control the amount of the switch units turned on. The LED strings 180_2 to 180_N may in order connect to the LED string 180_1 in series for illumination without larger operation voltage VAC.

The current source 120 includes an operation amplifier 350 and a transistor M3. The first input terminal, e.g. the positive input terminal, of the operation amplifier 350 receives a predetermined voltage VF. The second input terminal, e.g. the negative input terminal, of the operation amplifier 350 is grounded through a resistance R2. The gate terminal of the transistor M3 electrically connects to the output terminal of the operation amplifier 350. The drain terminal of the transistor M3 provides the voltage VD of the current source 120. The source terminal of the transistor M3 electrically connects to the second input terminal of the operation amplifier 350. The current source 120 may be, but not limit to, a constant current source or an adjustable current source.

Besides, the state signal generator 330 outputs the first control signals according to the detection signal and further outputs the second control signal according to the detection signal. The control unit 140 may further include a selection unit 360.

The selection unit 360 is configured between and electrically connects to the state signal generator 330 and the first input terminal of the operation amplifier 350. The selection unit 360 receives the second control signal and a plurality of third reference voltages VREF3_1 to VREF3_M, and selects one of the third reference voltages VREF3_1 to VREF3_M as the predetermined voltage VF. The predetermined voltage VF is provided to the first input terminal of the operation amplifier 350. M is a positive integer greater than 1. While the control unit 140 increases or reduces the amount of the switch units turned on, the selection unit 360 adjusts, e.g. increases or reduces, the current passing through the current source 120. The third reference voltages VREF3_1 to VREF3_M have different levels.

Figure 4:
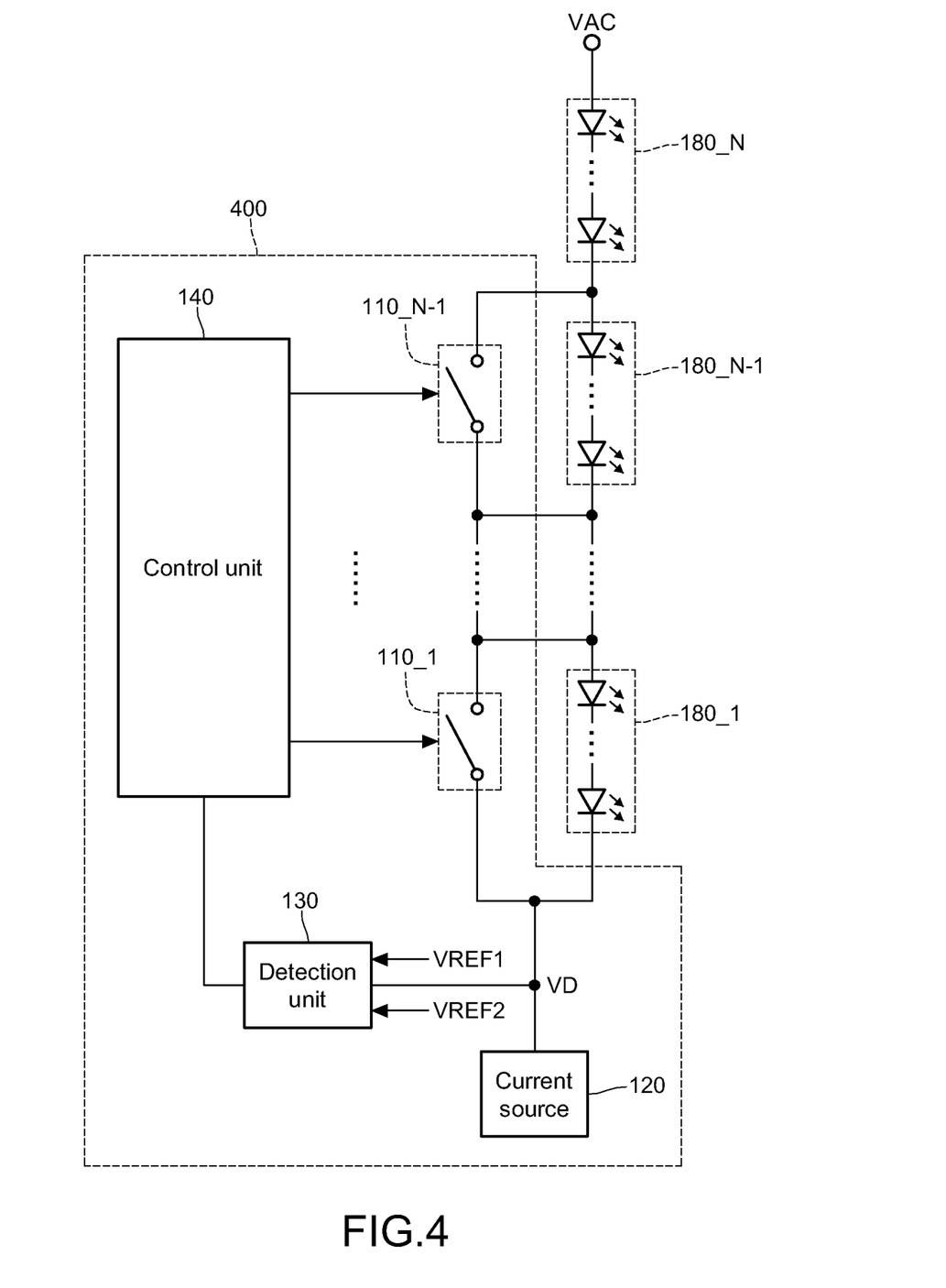
FIG. 4 is a block diagram of a LED driving device according to another embodiment of the disclosure.

FIG. 4 illustrates a block diagram of a LED driving device according to another embodiment of the disclosure. The LED driving device 400 drives N LED strings 180_1 to 180_N. N is a positive integer greater than 1. The positive terminal of the Nth Led string 180_N receives the operation voltage VAC which may be the voltage generated by a bridge rectifier which rectifies an AC voltage. The LED driving device 400 includes (N−1) switch units 110_1 to 110_N−1, a current source 120, a detection unit 130 and a control unit 140.

The difference between FIG. 1 and FIG. 4 is the connection between the switch units and the LED strings. In FIG. 1, the ith switch unit electrically connects to the (i+1)th LED string in parallel. In FIG. 4, the ith switch unit electrically connects to the ith LED string in parallel. i satisfies 0<i≤N−1.

In one embodiment, the first switch unit 110_1 electrically connects to the first LED string 180_1 in parallel, the second switch unit 110_2 electrically connects to the second LED string 180_2 in parallel, and so forth. The operation among the switch units 110_1 to 110_N−1 is the same as the operation thereof in FIG. 1. Besides, the operation and connection among the current source 120, the detection unit 130 and the control unit 140 are the same as those in FIG. 1.

Figure 5:
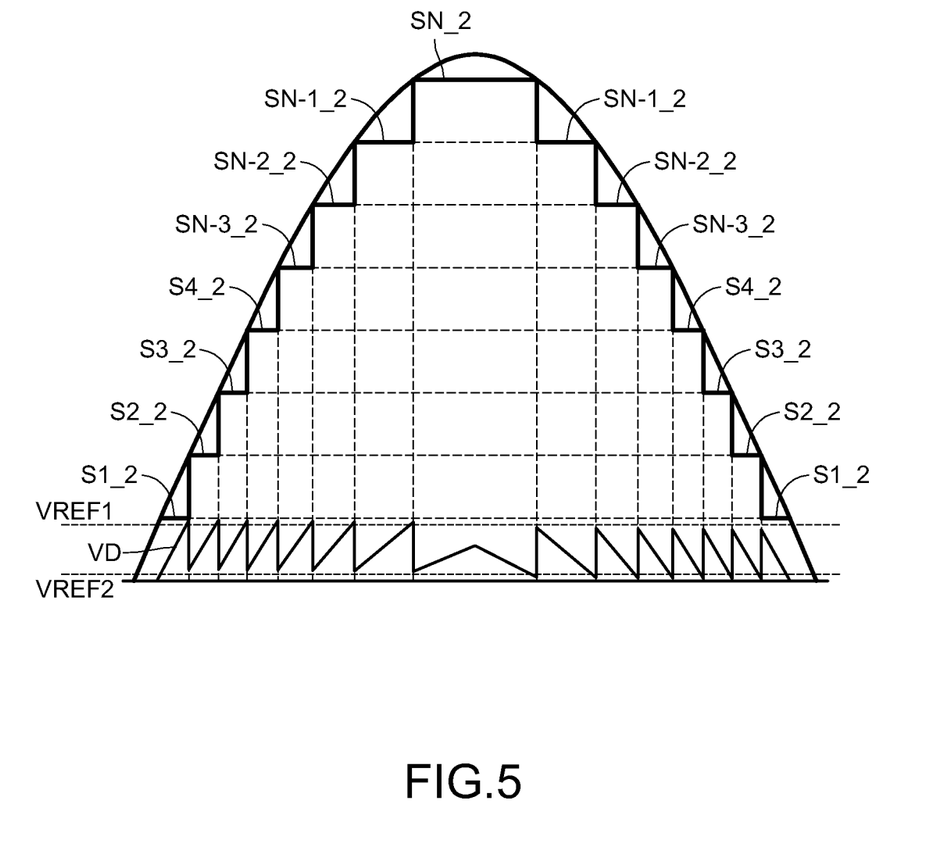
FIG. 5 is a schematic diagram of the waveforms illustrating the operation voltage, the first reference voltage, the second reference voltage, the voltage of the current source, and the current passing through the current source according to another embodiment of the disclosure.

FIG. 5 illustrates a schematic diagram of the waveforms illustrating the operation voltage, the first reference voltage, the second reference voltage, the voltage of the current source, and the current passing through the current source according to another embodiment of the disclosure.

The curve S1_2 indicates the current passing through the current source 120 when the LED string 180_N illuminates based on the turned-on switch units 110_1 to 110_N−1. The curve S2_2 indicates the current passing through the current source 120 when the LED strings 180_N and 180_N−1 illuminate based on the turned-off switch unit 110_N−1 and the turned-on switch units 110_1 to 110_N−2. The curve S3_2 indicates the current passing through the current source 120 when the LED strings 180_N, 180_N−1 and 180_N−2 illuminate based on the turned-off switch units 110_N−1 and 110_N−2 and the turned-on switch units 110_1 to 110_N−3. The curve S4_2 indicates the current passing through the current source 120 when the LED strings 180_N to 180_N−3 illuminate based on the turned-off switch units 110_N−1 to 110_N−3 and the turned-on switch units 110_1 to 110_N−4.

The curve SN-3_2 indicates the current passing through the current source 120 when the LED strings 180_N to 180_4 illuminate based on the turned-off switch units 110_1 to 110_4 and the turned-on switch units 110_3 to 110_1. The curve SN-2_2 indicates the current passing through the current source 120 when the LED strings 180_N to 180_3 illuminate based on the turned-off switch units 110_N−1 to 110_N−3 and the turned-on switch units 110_2 to 110_1. The curve SN-1_2 indicates the current passing through the current source 120 when the LED strings 180_N to 180_2 illuminate based on the turned-off switch units 110_N−1 to 110_2 and the turned-on switch unit 110_1. The curve SN_2 indicates the current passing through the current source 120 when the LED strings 180_1 to 180_N based on the turned-off switch units 110_1 to 110_N−1.

The control unit 140 increases or reduces the amount of the switch units turned off according to above operation manner, or increases or reduces the amount of the switch units turned off according to the order of the switch units. The detailed operation of the switch units turned on or off in FIG. 5 is based on that in FIG. 2.

Figure 6:
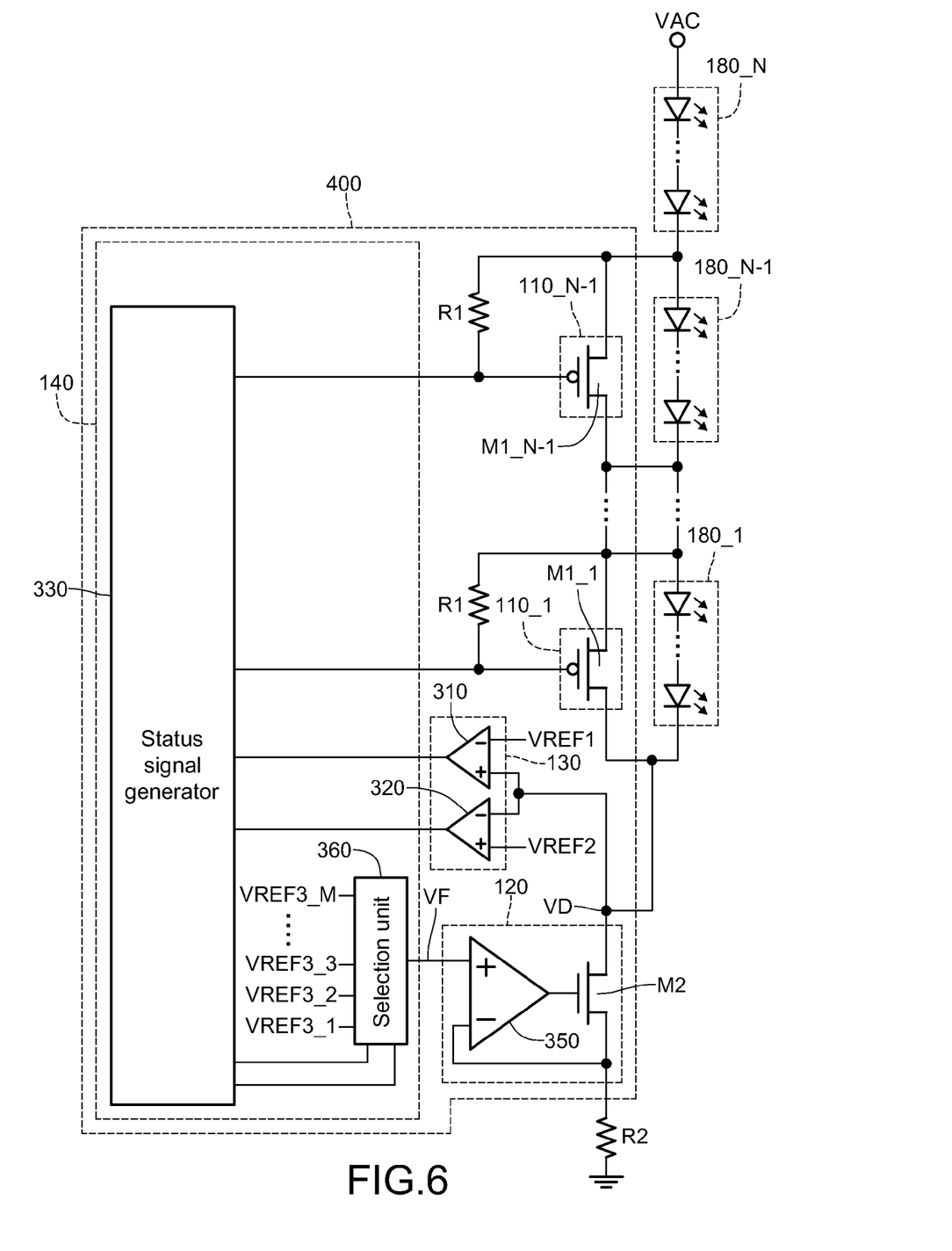
FIG. 6 is a circuit diagram of the LED driving device according to another embodiment of the disclosure.

FIG. 6 illustrates a circuit diagram of the LED driving device according to another embodiment of the disclosure. The components and the connection thereof in the LED driving device 400 are shown in FIG. 6. The difference between FIG. 3 and FIG. 6 is the connection between each switch unit and each LED string. In FIG. 3, each of the switch units 110_1 to 110_N−1 respectively electrically connects to one of the LED strings 180_2 to 180_N in parallel. In FIG. 6, each of the switch units 110_1 to 110_N−1 respectively electrically connects to one of the LED strings 180_1 to 180_N−1 in parallel. The operation of the LED driving device 400 is similar to that in FIG. 3.

Through the structure which one LED string connects to one switch unit in parallel, the control unit may control whether each switch unit is turned on or not, according to the detection signal outputted by the detection unit. Thus, the efficient to control the LED strings may be increased to reduce hardware cost and power consumption, and the LED driving device may have higher operation efficient and higher power factor.

The disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and region of equivalency of the claims are to be embraced within their scope.

What is claimed is:

1. A light emitting device (LED) driving device, adapted to driving N LED strings connected in series, wherein N is a positive integer greater than 1, the LED driving device comprises:

(N−1) switch units, wherein the ith switch unit electrically connecting to the (i+1) LED string in parallel or to the ith LED string in parallel, and 0<i≤(N−1);
a current source, having a first terminal electrically connecting to the negative terminal of the first LED string and supplying a driving current to drive the N LED strings;
a detection unit, electrically connecting to the current source and configured to receive a voltage of the current source, a first reference voltage, and a second reference voltage to output a detection signal; and
a control unit, electrically connecting to the (N−1) switch units and the detection unit and configured to receive the detection signal and output a plurality of first control signals according to the detection signal to dynamically control an amount of the (N−1) switch units turned on;
wherein the control unit comprises a state signal generator, the state signal generator electrically connecting to the detection unit and configured to receive the detection signal, and output the first control signals according to the detection signal, wherein each first control signal corresponds to one of the (N−1) switch units;
wherein the current source comprises:
an operation amplifier, having a first input terminal receiving a predetermined voltage, and a second input terminal grounded through a resistance; and
a second transistor, having a gate terminal electrically connecting to an output terminal of the operation amplifier, a drain terminal providing the voltage of the current source, and a source terminal electrically connecting to the second input terminal of the operation amplifier;
wherein the state signal generator further generates a second control signal according to the detection signal, and the control unit further comprises:
a selection unit, configured between and electrically connecting to the state signal generator and the first input terminal of the operation amplifier, and configured to receive the second control signal and a plurality of third reference voltages to select one of the third reference voltages as the predetermined voltage according to the second control signal.

2. The LED driving device according to claim 1, wherein when the voltage of the current source is greater than the first reference voltage, the control unit reduces the amount of the (N−1) switch units turned on.

3. The LED driving device according to claim 1, wherein when the voltage of the current source is smaller than the second reference voltage, the control unit increases the amount of the (N−1) switch units turned on.

4. The LED driving device according to claim 1, wherein when the voltage of the current source is greater than the second reference voltage and smaller than the first reference voltage, the control unit maintains the amount of the (N−1) switch units turned on.

5. The LED driving device according to claim 1, wherein the detection unit comprises:
a first comparator, having a first input terminal receiving the first reference voltage, a second input terminal receiving the voltage of the current source, and an output terminal outputting the detection signal; and
a second comparator, having a first input terminal receiving the second reference voltage, a second input terminal electrically connecting to the second input terminal of the first comparator, and an output terminal outputting the detection signal.

6. The LED driving device according to claim 1, wherein each of the N LED strings comprises a plurality of LEDs connected in series.

* * * * *